(12) United States Patent
Oishi et al.

(10) Patent No.: US 12,275,001 B2
(45) Date of Patent: Apr. 15, 2025

(54) EXHAUST GAS PURIFICATION CATALYST

(71) Applicant: Cataler Corporation, Kakegawa (JP)

(72) Inventors: Shunsuke Oishi, Kakegawa (JP);
Takaya Ota, Kakegawa (JP); Taku Miura, Kakegawa (JP); Hiromi Togashi, Kakegawa (JP); Ryosuke Takasu, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 342 days.

(21) Appl. No.: 17/801,091

(22) PCT Filed: Dec. 7, 2020

(86) PCT No.: PCT/JP2020/045390
§ 371 (c)(1),
(2) Date: Aug. 19, 2022

(87) PCT Pub. No.: WO2021/166382
PCT Pub. Date: Aug. 26, 2021

(65) Prior Publication Data
US 2023/0078076 A1    Mar. 16, 2023

(30) Foreign Application Priority Data
Feb. 21, 2020   (JP) .................. 2020-027925

(51) Int. Cl.
*B01J 21/04*   (2006.01)
*B01D 53/94*   (2006.01)
(Continued)

(52) U.S. Cl.
CPC .......... *B01J 23/63* (2013.01); *B01D 53/9413* (2013.01); *B01D 53/944* (2013.01);
(Continued)

(58) Field of Classification Search
CPC ... B01J 21/04; B01J 23/10; B01J 23/42; B01J 23/44; B01J 23/46; B01J 35/23;
(Continued)

(56) References Cited

U.S. PATENT DOCUMENTS 4,738,946 A  *  4/1988  Yamashita ............. C10G 49/02
                                                502/302
4,904,633 A  *  2/1990  Ohata ....................... B01J 35/56
                                                502/328

(Continued)

FOREIGN PATENT DOCUMENTS

JP    2009221913 A    10/2009
JP    2011036834 A    2/2011
(Continued)

OTHER PUBLICATIONS

Office Action issued in Chinese Application No. 202080097138.1 dated Mar. 7, 2024.
(Continued)

*Primary Examiner* — Cam N. Nguyen
(74) *Attorney, Agent, or Firm* — Occhiuti & Rohlicek LLP (57) ABSTRACT

In accordance with the technology herein disclosed, an exhaust gas purification catalyst exhibiting a high exhaust gas purifying performance using a new rare earth-containing material is provided. The exhaust gas purification catalyst herein disclosed includes a base material and a catalyst layer formed on the surface of the base material. The catalyst layer of such an exhaust gas purification catalyst includes rare earth-carrying alumina 50 including a primary particle of a rare earth particle 40 including at least one rare earth element carried on the surface of an alumina carrier 30 including alumina, and the average particle diameter $D_{50}$ based on TEM observation of the rare earth particle 40 in the rare earth-carrying alumina 50 is 10 nm or less. As a result (Continued)

of this, it is possible to provide an exhaust gas purification catalyst having high NOx adsorption performance and CO adsorption performance.

8 Claims, 5 Drawing Sheets

(51) Int. Cl.
*B01J 23/10* (2006.01)
*B01J 23/42* (2006.01)
*B01J 23/44* (2006.01)
*B01J 23/46* (2006.01)
*B01J 23/63* (2006.01)
*B01J 35/23* (2024.01)
*B01J 35/61* (2024.01)

(52) U.S. Cl.
CPC ............ *B01D 53/945* (2013.01); *B01J 21/04* (2013.01); *B01J 35/23* (2024.01); *B01J 35/613* (2024.01); *B01D 2257/40* (2013.01); *B01D 2257/50* (2013.01); *B01D 2257/702* (2013.01); *B01D 2258/01* (2013.01)

(58) Field of Classification Search
CPC .. B01J 35/613; B01D 53/9413; B01D 53/944; B01D 53/945
USPC ........ 502/302–304, 332–334, 339, 349, 355, 502/415
See application file for complete search history.

(56) References Cited

U.S. PATENT DOCUMENTS

| | | | | |
|---|---|---|---|---|
| 4,927,799 A * | 5/1990 | Matsumoto | ............... | B01J 23/83 502/303 |
| 5,039,647 A * | 8/1991 | Ihara | ..................... | B01D 53/945 502/332 |
| 5,075,276 A * | 12/1991 | Ozawa | ..................... | B01J 23/63 502/302 |
| 7,638,460 B2 * | 12/2009 | Nakamura | ............... | B01J 23/40 502/262 |
| 7,759,279 B2 * | 7/2010 | Shiratori | .............. | B01J 37/0221 502/303 |
| 7,833,930 B2 * | 11/2010 | Kikuchi | ............... | B01J 37/0248 502/308 |
| 7,977,276 B2 * | 7/2011 | Kikuchi | ............... | B01D 53/945 502/325 |
| 8,043,992 B2 * | 10/2011 | Hatanaka | .................. | C01B 3/06 502/328 |
| 8,741,799 B2 * | 6/2014 | Matsueda | ............ | B01J 37/0219 502/170 |
| 8,796,172 B2 * | 8/2014 | Chinzei | ................ | B01D 53/945 502/262 |
| 2019/0111389 A1 * | 4/2019 | Camm | ................. | B01D 53/945 |

FOREIGN PATENT DOCUMENTS

| | | |
|---|---|---|
| JP | 2011101843 A | 5/2011 |
| JP | 2011144083 A | 7/2011 |
| JP | 2013154261 A | 8/2013 |
| JP | 2016517343 A | 6/2016 |
| JP | 2016203116 A | 12/2016 |
| JP | 2017177014 A | 10/2017 |
| JP | 2018513781 A | 5/2018 |
| JP | 6360606 B1 | 7/2018 |
| WO | 2014164876 A1 | 10/2014 |
| WO | 2016149483 A1 | 9/2016 |

OTHER PUBLICATIONS

Extended European Search Report mailed Jun. 5, 2023 in European Application No. 20919590.8.
International Preliminary Report on Patentability mailed Sep. 1, 2022 in International Application No. PCT/JP2020/045390.
International Search Report, PCT Application No. PCT/JP2020/045390, mailed Feb. 16, 2021 (3 pages).
Japanese Office Action in JP 2022-501648, dated Oct. 3, 2024 (6 pages).
Chinese Office Action in CN 202080097138.1, dated Oct. 16, 2024 (5 pages).

* cited by examiner

FIG.11

EXHAUST GAS PURIFICATION CATALYST

CROSS REFERENCE TO RELATED APPLICATIONS

This application is a 371 National Stage application of International Application no. PCT/JP2020/045390, filed Dec. 7, 2020, which claims the benefit of the filing date of JP Application No. JP2020-027925, filed Feb. 21, 2020, the contents of which are hereby incorporated by reference in their entireties.

TECHNICAL FIELD

The present invention relates to an exhaust gas purification catalyst. More particularly, it relates to an exhaust gas purification catalyst arranged in the exhaust passage of an internal combustion engine, and for purifying an exhaust gas exhausted from the internal combustion engine. Incidentally, the present international application claims priority based on Japanese Patent Application No. 2020-27925 filed on Feb. 21, 2020, the entire contents of which are incorporated by reference in the present description.

BACKGROUND ART

The exhaust gases exhausted from an internal combustion engine such as an automotive engine include noxious gas components such as carbon monoxide (CO), hydrocarbon (HC), and nitrogen oxide (NOx). In order to purify the noxious components with efficiency, an exhaust gas purification catalyst is arranged in the exhaust passage of an internal combustion engine. Generally, the exhaust gas purification catalyst includes a base material and a catalyst layer formed on the surface of the base material. When an exhaust gas comes in contact with the catalyst layer of the exhaust gas purification catalyst, noxious components such as CO, HC, and NOx are detoxified by the chemical actions such as oxidation/reduction. Further, the catalyst layer also has a physically purifying action of adsorbing/collecting the noxious components in the exhaust gas.

In the field of the exhaust gas purification catalyst, a material including a rare earth element (rare earth-containing material) is added to the catalyst layer according to various objects. For example, in Patent Literature 1, a Ce-containing composite oxide of an OSC material having OSC: Oxygen Storage Capacity is added to the catalyst layer. In the exhaust gas purification catalyst disclosed in this literature, a Ce-containing composite oxide powder including a secondary particle (secondary particle with a cumulative distribution 50 mass % particle diameter of 150 nm or more and 210 nm or less) resulting from the aggregation of a large number of primary particles with an average particle diameter of 5 nm or more and 10 nm or less is carried on the surface of an active alumina powder.

Further, other examples thereof may include the technology of using a rare earth-containing material as a NOx adsorbent. For example, with the exhaust gas purification catalyst described in Patent Literature 2, a cerium type material and a lanthanum type material are added to the catalyst layer. The cerium type material functions as a NOx adsorbent in low-temperature environment (150° C. to 350° C.) under a lean atmosphere. The lanthanum type material functions as a NOx adsorbent in high-temperature environment (350° C. to 450° C.) under a lean atmosphere. Thus, addition of two kinds of rare earth element compounds as NOx adsorbents having different proper temperatures can allow a high NOx purifying performance to be exhibited.

CITATION LIST

Patent Literature

Patent Literature 1: Japanese Patent Application Publication No. 2011-36834
Patent Literature 2: Japanese Patent Application Publication No. 2009-221913

SUMMARY OF INVENTION

Technical Problem

Incidentally, the regulation on the noxious components in an exhaust gas has been tightened year by year. The demand for the improvement of the performances of an exhaust gas purification catalyst has also been strengthened according to the tightening of the regulation. The present inventors conducted various experiments and studies in order to meet such a demand. As a result, the present inventors found a rare earth-containing material exhibiting different effects from those in the related art. The present invention was completed based on such findings. It is an object of the present invention to provide an exhaust gas purification catalyst exhibiting a high exhaust gas purifying performance using a new rare earth-containing material.

Solution to Problem

As described above, the present inventors conducted various experiments and studies, and as a result, found a rare earth-containing material exhibiting different effects from those in the related art. Specifically, the present inventors found out the following matters. When particles including a rare earth element (rare earth particles) are dispersed highly with a very microscopic particle diameter, not only a higher NOx adsorption performance than that of a conventional NOx adsorbent is exhibited, but also the adsorption performance with respect to CO is exhibited. When the CO adsorption performance by the rare earth particle is preferably exhibited, it is possible to largely reduce the CO exhaust amount in low-temperature environment where the chemical purification by a noble metal catalyst does not function sufficiently (typically, immediately after the operation of the internal combustion engine). Further, CO adsorbed by the rare earth particle generates heat upon being oxidized, which can also contribute to the improvement of the catalyst warm-up performance.

However, the rare earth particle with a microscopic particle diameter is low in heat resistance. For this reason, coarsening due to sintering tends to be caused. Accordingly, with an exhaust gas purification catalyst that is increased in temperature up to 600° C. or more during use, it is difficult to keep the adsorption performance with respect to NOx and CO at a high level. For this reason, the present inventors further conducted a close study, and came to realize that a rare earth particle in a microscopic primary particle state is carried on an alumina carrier excellent in heat resistance, leading to the completion of the present invention.

The exhaust gas purification catalyst herein disclosed was completed based on the foregoing findings. The exhaust gas purification catalyst is an exhaust gas purification catalyst arranged in the exhaust passage of an internal combustion engine, and for purifying the exhaust gas exhausted from the internal combustion engine, and includes a base material and a catalyst layer formed on the surface of the base material. Then, the catalyst layer of the exhaust gas purification catalyst herein disclosed includes rare earth-carrying alumina in which a primary particle of a rare earth particle including at least one rare earth element is carried on the surface of an alumina carrier including alumina. The average particle diameter $D_{50}$ based on the TEM observation of the rare earth particle in the rare earth-carrying alumina is 10 nm or less.

In the exhaust gas purification catalyst herein disclosed, a primary particle of a microscopic rare earth particle with a $D_{50}$ average particle diameter of 10 nm or less is carried on an alumina carrier. As a result of this, the rare earth particle can be allowed to function as an active point for exhibiting a preferable adsorption performance with respect to NOx and CO. For this reason, in accordance with the technology herein disclosed, it is possible to provide an exhaust gas purification catalyst having a high purifying performance with respect to NOx and CO in low-temperature environment, and excellent in catalyst warm-up performance. Thus, in accordance with the technology herein disclosed, it is possible to provide an exhaust gas purification catalyst using a new rare earth-containing material, and exhibiting a high exhaust gas purifying performance.

Further, in accordance with one aspect of the exhaust gas purification catalyst herein disclosed, the catalyst layer further includes a noble metal catalyst. The noble metal catalyst oxidizes CO adsorbed on a rare earth particle, and reduces and purifies NOx, and hence can exhibit a still higher purifying performance with respect to the noxious components in an exhaust gas.

Furthermore, in accordance with another aspect of the exhaust gas purification catalyst herein disclosed, the oxide equivalent weight of the rare earth particle is 5 wt % or more and 20 wt % or less when the oxide equivalent weight of the alumina carrier is assumed to be 100 wt %. As a result of this, the primary particles of a microscopic rare earth particle can be carried in a highly dispersed state on the surface of the alumina carrier. For this reason, coarsening of the rare earth particle due to sintering can be suppressed, so that the adsorption performance with respect to NOx and CO can be exhibited with stability.

Further, in accordance with a till other aspect of the exhaust gas purification catalyst herein disclosed, a specific surface area of the alumina carrier after carrying out a 1000° C. durability test for 10 hours is 50 m²/g or more. Thus, by using an alumina carrier with a high heat resistance capable of keeping a wide specific surface area even in high-temperature environment, it is possible to more preferably suppress the coarsening of a rare earth particle due to sintering. For this reason, the adsorption performance with respect to NOx and CO can be exhibited with more stability.

Furthermore, in accordance with a still other aspect of the exhaust gas purification catalyst herein disclosed, the rare earth particle includes at least one or more rare earth elements selected from the group of Y, La, Ce, Pr, and Nd. The rare earth particle including the rare earth elements can preferably exhibit the adsorption performance with respect to NOx and CO by being dispersed in a microscopic primary particle state. Incidentally, out of the rare earth elements described above, Ce is particularly preferable. Typically, for the rare earth particle, the oxide equivalent weight of the elements other than Ce is preferably 80 wt % or less for every 100 wt % of the total oxide equivalent weight of the rare earth element. Such a rare earth particle including Ce as the main element can exhibit a particularly preferable adsorption performance with respect to NOx and CO.

Still further, in accordance with a furthermore aspect of the exhaust gas purification catalyst herein disclosed, the catalyst layer includes La as the main element of the rare earth particle, and includes Pd as a noble metal catalyst. The rare earth particle including La as the main element also has a function of improving the reduction action by a noble metal catalyst (Pd) in addition to the adsorption performance with respect to NOx and CO. For this reason, in accordance with the present aspect, it is possible to suppress the emission of $NH_3$ caused by incomplete reduction of NOx.

DESCRIPTION OF EMBODIMENTS

Below, preferred embodiments of the present invention will be described by reference to the accompanying drawings. Incidentally, matters necessary for executing the present invention, except for matters specifically referred to in the present description (e.g., the detailed structure of the base material) can be grasped as design matters of those skilled in the art based on the related art in the present field. The present invention can be executed based on the contents disclosed in the present description, and the technical common sense in the present field.

Layout of Exhaust Gas Purifying Catalyst

Figure 1:
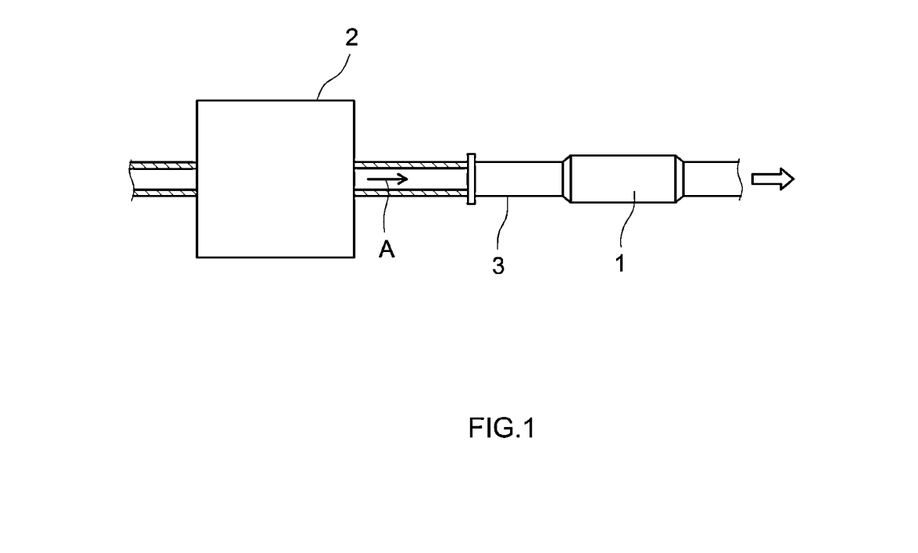
FIG. 1 is a view schematically showing an exhaust system of an internal combustion engine including an exhaust gas purification catalyst arranged therein.

FIG. 1 is a view schematically showing an exhaust system of an internal combustion engine including an exhaust gas purification catalyst arranged therein. Incidentally, an arrow A in each drawing of the present description shows a flow of the exhaust gas. In the present description, for convenience of description, the side to which an exhaust gas is supplied is referred to as the "upstream side of the gas flow", and the side from which an exhaust gas is exhausted is referred to as the "downstream side of the gas flow".

As shown in FIG. 1, an exhaust gas purification catalyst 1 is arranged at an exhaust passage 3 of an internal combustion engine (engine) 2. The internal combustion engine 2 has a mechanism for burning a mixed gas including oxygen and a fuel gas, and converting the combustion energy into a mechanical energy. As one example, the internal combustion engine 2 mainly includes a gasoline engine. Incidentally, the internal combustion engine 2 may be an engine other than a gasoline engine (e.g., a diesel engine). Further, the exhaust passage 3 is a gas channel including an exhaust manifold, an exhaust pipe, or the like. The exhaust gas purification catalyst 1 is arranged in the exhaust passage 3 (typically, the exhaust pipe). The exhaust gas generated at the internal combustion engine 2 is purified at the exhaust gas purification catalyst 1, and then, is exhausted to the outside.

Below, the exhaust gas purification catalyst herein disclosed will be described by taking first to third embodiments as examples. Incidentally, the exhaust gas purification catalyst herein disclosed includes the ones obtained by modifying/changing the exhaust gas purification catalyst in accordance with each embodiment within the scope of the design matter of those skilled in the art. Namely, the exhaust gas purification catalyst herein disclosed is not limited to the first to third embodiments.

First Embodiment

Figure 2:
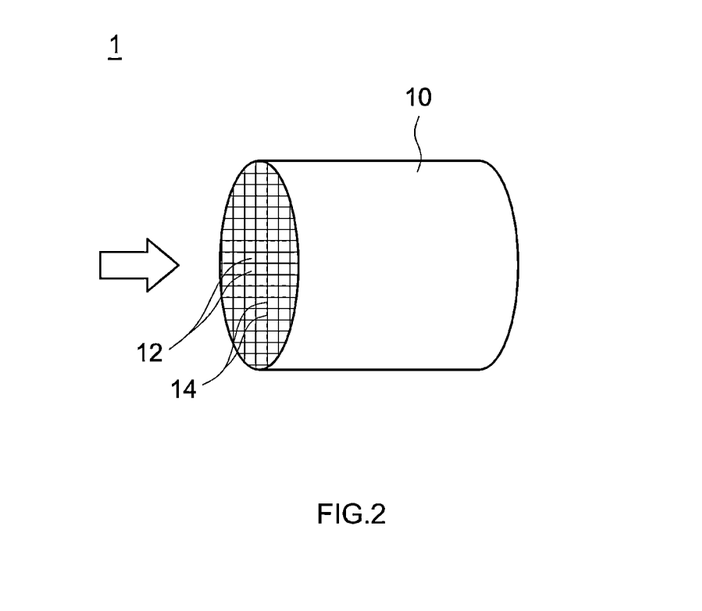
FIG. 2 is a perspective view schematically showing an exhaust gas purification catalyst in accordance with a first embodiment.
Figure 3:
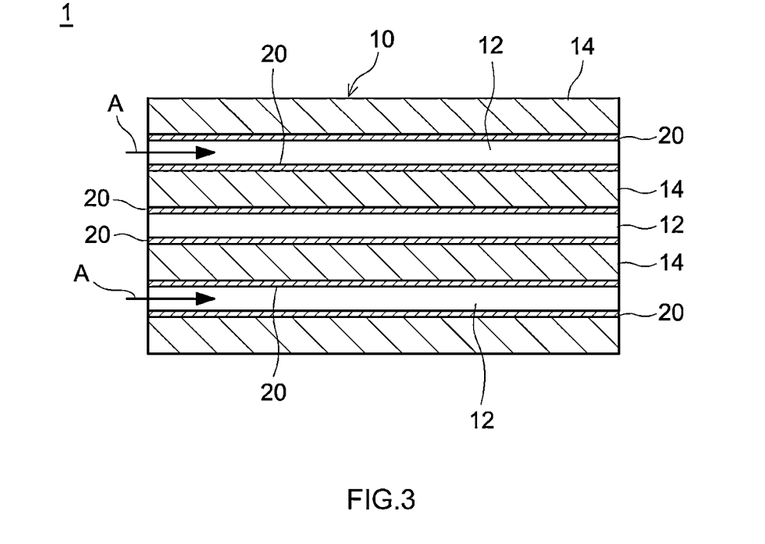
FIG. 3 is a view schematically showing a cross section along the axial direction of the exhaust gas purification catalyst in accordance with the first embodiment.

FIG. 2 is a perspective view schematically showing the exhaust gas purification catalyst in accordance with the first embodiment. FIG. 3 is a view schematically showing a cross section along the axial direction of the exhaust gas purification catalyst in accordance with the first embodiment. As shown in FIGS. 2 and 3, the exhaust gas purification catalyst 1 in accordance with the present embodiment includes a base material 10, and a catalyst layer 20 formed on the surface of the base material 10.

(1) Base Material

As shown in FIG. 2, the base material 10 in the present embodiment is a cylindrical base material having a honeycomb structure. Namely, the base material 10 includes a partition wall 14 for separating a cell 12 of a gas channel through which an exhaust gas passes, and the adjacent cell 12. The base material 10 in the present embodiment is a so-called straight flow type base material. Specifically, as shown in FIG. 3, the cell 12 of the base material 10 extends along the axial direction (the gas flow direction A) of the base material 10, and both ends of the cell 12 are opened. Incidentally, for the exhaust gas purification catalyst herein disclosed, the structure of the base material has no particular restriction. For example, a so-called wall-through type base material having an entry side cell sealed on the downstream side, and an exit side cell sealed on the upstream side, the entry side cell and the exit side cell being separated from each other by a porous partition wall can be used. Alternatively, as base materials in other shapes than a honeycomb shape, base materials in a foam shape, a pellet shape, or the like can also be used. Further, the outer shape of the base material is not limited to a cylindrical shape, and an elliptic cylindrical shape, a polygonal cylindrical shape, or the like can be adopted.

Incidentally, for the base material 10, various materials conventionally used for this kind of use can be used. For example, as the materials for the base material 10, ceramics having a high heat resistance can be used. Specifically, for the base material 10, aluminum oxide ($Al_2O_3$), cerium oxide ($CeO_2$), titanium oxide ($TiO_2$), zirconium oxide ($ZrO_2$), silicon dioxide ($SiO_2$), or aluminum titanate ($AL_2TiO_5$)) can be used. Further, as other materials, mention may also be made of composite oxide type ceramics such as cordierite ($2MgO \cdot 2Al_2O_3 \cdot 5SiO_2$), and carbide type ceramics such as silicon carbide (SiC). Alternatively, as other materials than ceramics, alloys of stainless steel, and the like can also be used.

(2) Catalyst Layer

The catalyst layer 20 is formed on the surface of the base material 10. Specifically, as shown in FIG. 3, the catalyst layer 20 is formed on the surface of the partition wall 14 separating the cells 12 inside the base material 10 The catalyst layer 20 is a porous layer including a noble metal catalyst. An exhaust gas comes in contact with the noble metal catalyst in the catalyst layer 20, thereby chemically purifying noxious components (CO, HC, and NOx) in the exhaust gas. As one example of the noble metal catalyst, mention may be made of a three-way catalyst for oxidizing CO and HC, and reducing NOx. Such a three-way catalyst can purify the noxious components in the exhaust gas with efficiency. Examples of the three-way catalyst may include particles mainly including platinum group elements such as platinum (Pt), palladium (Pd), rhodium (Rh), ruthenium (Ru), osmium (Os), and iridium (Ir). Incidentally, out of the platinum group elements, Pt, Pd, and Rh can exhibit a particularly excellent purifying performance with respect to the noxious components.

Incidentally, the noble metal catalyst in the catalyst layer 20 is preferably carried on the surface of rare earth-carrying alumina described later (typically, both the surfaces of an alumina carrier and a rare earth particle). As a result of this, it is possible to preferably reduce (or oxidize) NOx or CO adsorbed by the rare earth particle. Incidentally, from the viewpoint of allowing a further preferable purifying performance to be exhibited, the content of the noble metal catalyst per L of volume of the base material 11 is preferably 0.1 g/L or more, more preferably 0.5 g/L or more, and in particular preferably 1 g/L or more. On the other hand, from the viewpoint of the material cost, the content of the noble metal catalyst is preferably 10 g/L or less, more preferably 8 g/L or less, and in particular preferably 7 g/L or less.

Figure 4:
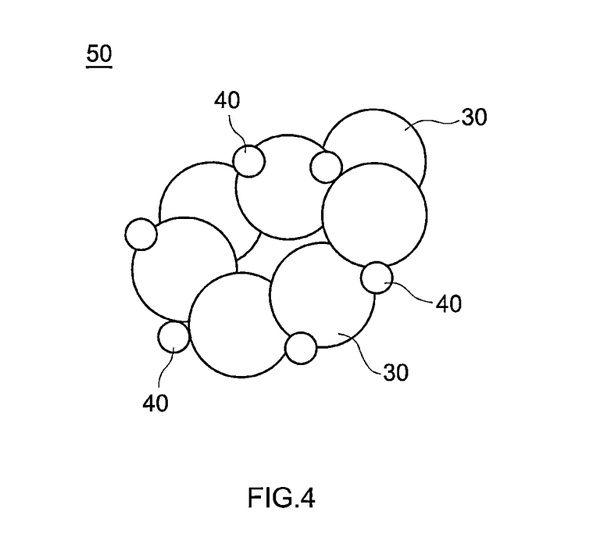
FIG. 4 is a view schematically showing rare earth-carrying alumina included in a catalyst layer in one embodiment.

Then, the catalyst layer 20 in the present embodiment includes rare earth-carrying alumina. FIG. 4 is a view schematically showing rare earth-carrying alumina included in the catalyst layer in the present embodiment. As shown in FIG. 4, rare earth-carrying alumina 50 in the present embodiment includes an alumina carrier 30 and a rare earth particle 40. Below, respective materials forming the rare earth-carrying alumina 50 will be described.

(a) Alumina Carrier

The alumina carrier 30 is a particle including alumina ($AL_2O_3$) as the main component. In the rare earth-carrying alumina 50, the alumina carrier 30 carries the rare earth particle 40, and has a function of preventing coarsening of the rare earth particle 40 by sintering. The alumina carrier 30 may include other components than alumina (e.g., metal oxides such as lanthanum oxide ($La_2O_3$), barium oxide (BaO), silicon dioxide ($SiO_2$), and titanium oxide ($TiO_2$)) so long as it exhibits a desirable heat resistance. Incidentally, the content of other components than alumina is preferably 1 wt % or more and 10 wt % or less, more preferably 1 wt % or more and 8 wt % or less, further preferably 1 wt % or more and 5 wt % or less, and in particular preferably 1 wt % or more and 4 wt % or less when the content of alumina is assumed to be 100 wt %. As a result of this, it is possible to sufficiently ensure the heat resistance of the alumina carrier 30, and to preferably prevent coarsening of the rare earth particle 40 by sintering. Incidentally, the alumina carrier 30 may include only alumina.

Further, the average particle diameter $D_{50}$ of the alumina carrier 30 is preferably 1 μm or more, more preferably 5 μm or more, further preferably 10 μm or more, and in particular preferably 15 μm or more. As a result of this, the heat resistance of the alumina carrier 30 can be sufficiently ensured. On the other hand, with a decrease in average particle diameter $D_{50}$ of the alumina carrier 30, the specific surface area increases. For this reason, the dispersibility of a rare earth particle 40 described later tends to be improved. From such a viewpoint, the average particle diameter of the alumina carrier 30 is preferably 100 μm or less, more preferably 70 μm or less, further preferably 50 μm or less, and in particular preferably 30 μm or less.

Incidentally, the "average particle diameter $D_{50}$" in the present description is the arithmetic average value of the equivalent circle diameters of the primary particles of a plurality of (e.g., 20) rare earth particles observed in a plurality of visual fields (e.g., four visual fields) of TEM observation. Specifically, an object to be measured is dispersed in a solvent (e.g., a mixed solvent of water and ethanol), which is added dropwise to the grid of Cu mesh, followed by drying, thereby manufacturing a measurement sample. Then, the measurement sample is observed by a TEM: Transmission Electron Microscope. Thus, the major axis and the minor axis of the particle observed in the visual field within a specific range (e.g., 200 nm×200 nm) are measured. The intermediate value thereof is measured as the equivalent circle diameter. Then, the average value of the equivalent circle diameters of the 40 particles measured is calculated. As a result, the "average particle diameter $D_{50}$" can be determined.

Further, as described above, when the specific surface area of the alumina carrier 30 increases, the dispersibility of the rare earth particle 40 is improved, resulting in an improvement of the adsorption performance with respect to NOx and CO. For this reason, the specific surface area of the alumina carrier 30 is preferably 40 $m^2/g$ or more, more preferably 50 $m^2/g$ or more, further preferably 55 $m^2/g$ or more, and in particular preferably 60 $m^2/g$ or more. Furthermore, the upper limit of the specific surface area of the alumina carrier 30 has no particular restriction, and may be 200 $m^2/g$ or less, may be 150 $m^2/g$ or less, may be 125 $m^2/g$ or less, and may be 100 $m^2/g$ or less. Incidentally, while the internal combustion engine 2 (see FIG. 1) is operating, the exhaust gas purification catalyst 1 is exposed to high-temperature environment at 600° C. or more. For this reason, the alumina carrier 30 preferably has an excellent heat resistance capable of keeping a large specific surface area even under high temperature environment. Specifically, for the alumina carrier 30, the specific surface area after carrying out a 1000° C. durability test for 10 hours is preferably 45 $m^2/g$ or more, more preferably 50 $m^2/g$ or more, further preferably 55 $m^2/g$ or more, and in particular preferably 60 $m^2/g$ or more. As a result of this, coarsening of the rare earth particle 40 by sintering can be preferably suppressed. For this reason, the adsorption performance with respect to NOx and CO can be exhibited with still more stability.

(b) Rare Earth Particle

A rare earth particle 40 is a particle including at least one rare earth element. The rare earth particle 40 is carried in a state of a microscopic primary particle (typically, a primary particle with an average particle diameter $D_{50}$ of 10 nm or less) on the surface of the alumina carrier 30. As a result of this, in the inside of the catalyst layer 20, the rare earth particle 40 can be highly dispersed in a state of a microscopic primary particle. In accordance with the experiment and the study by the present inventors, when the microscopic rare earth particle 40 thus does not form an aggregated particle (secondary particle), and is highly dispersed in the inside of the catalyst layer 20, the rare earth particle 40 functions as an active point for adsorbing NOx and CO. Accordingly, high NOx adsorption performance and CO adsorption performance can be exhibited. For this reason, the exhaust gas purification catalyst 1 in accordance with the present embodiment removes NOx and CO from the exhaust gas even under low-temperature environment in which the chemical purification by a noble metal catalyst does not sufficiently function, and can reduce the exhaust amount of the noxious components. Further, CO adsorbed by the rare earth particle 40 generates heat upon being oxidized, which can also contribute to the improvement of the catalyst warm-up performance.

Incidentally, all the rare earth particles 40 carried on the surface of the alumina carrier 30 are not required to be primary particles, and some thereof may include secondary particles. Specifically, when 40% or more (preferably 50% or more, more preferably 60% or more, and further preferably 70% or more) of the rare earth particles 40 observed by TEM are primary particles, preferable NOx adsorption performance and CO adsorption performance can be exhibited. Further, the upper limit of the proportion of the primary particles has no particular restriction, and may be 100% (all being primary particles), and may be 80% or less. Incidentally, the "proportion of the primary particles of the rare earth particle" can be measured by TEM observation. Specifically, the numbers of the primary particles and the secondary particle of the rare earth particles observed in the visual field within a specific range (e.g., 200 nm×200 nm) in the TEM observation of the measurement sample manufactured for the average particle diameter D50 are counted. Then, the proportion of the number of the primary particles based on the total number of particles (the total number of the primary particles and the secondary particles) in a plurality of visual fields (e.g., 4 visual fields) is calculated. As a result, the "proportion of the primary particles of the rare earth particles" can be determined.

Further, as described above, the average particle diameter $D_{50}$ of the primary particles of the rare earth particles 40 in the present embodiment is 10 nm or less. By dispersing such microscopic rare earth particles 40, preferable adsorption performance with respect to NOx and CO can be exhibited. Incidentally, from the viewpoint of further improving the adsorption performance with respect to NOx and CO, the average particle diameter $D_{50}$ of the primary particles of the rare earth particles 40 is preferably 9 nm or less, more preferably 8 nm or less, further preferably 7 nm or less, and in particular preferably 6 nm or less. On the other hand, the lower limit value of the average particle diameter $D_{50}$ of the primary particles of the rare earth particles 40 has no particular restriction, and may be 0.01 nm or more, and may be 0.05 nm or more. However, with a decrease in average particle diameter $D_{50}$ of the primary particles of the rare earth particles 40, the aggregation force among the primary particles becomes stronger. For this reason, the secondary particle becomes more likely to be formed. In consideration of such a point, the average particle diameter $D_{50}$ of the primary particles of the rare earth particles 40 is preferably 0.1 nm or more, more preferably 0.5 nm or more, further preferably 1 nm or more, and in particular preferably 3 nm or more.

Further, for the rare earth particle 40, the maximum particle diameter of the primary particle is preferably 30 nm or less (more preferably 25 nm or less, further preferably 23 nm or less, and in particular preferably 20 nm or less). As a result of this, most of the rare earth particles 40 carried on the surface of the alumina carrier 30 can be allowed to function as an active point for adsorbing NOx and CO. Further, the lower limit value of the maximum particle diameter of the primary particle has no particular restriction, and may be 1 nm or more, may be 5 nm or more, may be 10 nm or more, and may be 15 nm or more. Incidentally, the "maximum particle diameter of the rare earth particle" in the present description indicates the maximum equivalent circle diameter of the equivalent circle diameters of the primary particle diameters of a plurality of rare earth particles measured in calculation of the average particle diameter $D_{50}$.

Incidentally, as the rare earth elements included in the rare earth particle 40 in the present embodiment, mention may be made of yttrium (Y), lanthanum (La), cerium (Ce), praseodymium (Pr), neodymium (Nd), and the like. The rare earth particle 40 including at least one of the rare earth elements exhibits preferable adsorption performance with respect to NOx and CO by being highly dispersed in a state of a microscopic primary particle. Further, the rare earth particle 40 may include other elements than the rare earth element. Examples of such other elements than the rare earth element may include transition metal elements such as zirconium (Zr), titanium, (Ti), vanadium (V), chromium (Cr), manganese (Mn), iron (Fe), cobalt (Co), nickel (Ni), copper (Cu), niobium (Nb), and molybdenum (Mo).

Out of the foregoing rare earth elements, Ce can exhibit the adsorption performance with respect to NOx and CO at a particularly high level. For this reason, the rare earth particle 40 is preferably a particle including Ce at the main element. Typically, when the main element of the rare earth particle 40 is assumed to be Ce, the oxide equivalent weight of the elements other than Ce for every 100 wt % of the total amount in terms of oxide of the rare earth element is preferably 80 wt % or less, more preferably 60 wt % or less, further preferably 40 wt % or less, and in particular preferably 20 wt % or less. As a result of this, the adsorption performance by Ce can be more preferably exhibited. On the other hand, the lower limit value of the oxide equivalent weight of the element other than Ce has no particular restriction. Namely, the rare earth particle 40 may include only Ce. Incidentally, the "elements other than Ce" include other rare earth elements than Ce (such as Y, La, Pr, and Nd).

Further, although described in details in a third embodiment described later, La out of the rare earth elements has a function of enhancing the chemically purifying performance by a noble metal catalyst (Pd). For this reason, out of the rare earth elements, Ce and La are preferable as the main elements forming the rare earth particle 40.

(c) Other Additives

Further, to the catalyst layer 20, other materials than the noble metal catalyst and the noble metal-carrying alumina may be added. For example, when a three-way catalyst is used as a noble metal catalyst, an OSC material is preferably added to the catalyst layer 20. Such an OSC material is a metal oxide having a function of occluding/releasing oxygen (e.g., a ceria-zirconia composite oxide). By adding such an OSC material to the catalyst layer 20, it is possible to keep the air-to-fuel ratio of the exhaust gas in the vicinity of the stoichiometry (stoichiometric air-to-fuel ratio), and to allow the chemically purifying action by the noble metal catalyst to be exhibited with stability. Furthermore, other examples of the additive included in the catalyst layer 20 may include a stabilizer and a binder.

Up to this point, the first embodiment regarding the exhaust gas purification catalyst herein disclosed has been described. Incidentally, the exhaust gas purification catalyst herein disclosed is not limited to such an embodiment, and includes various modified/changed ones.

Second Embodiment

Figure 5:
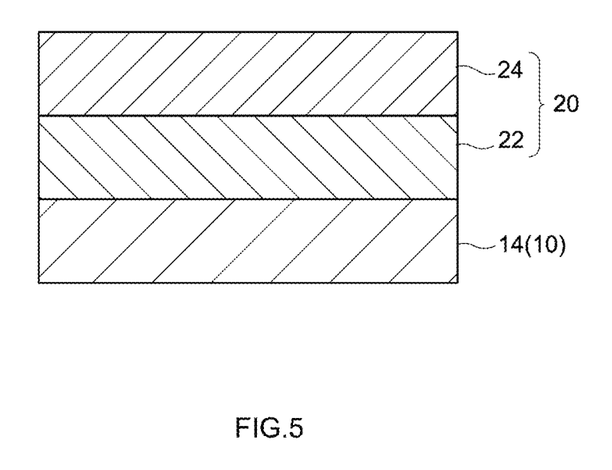
FIG. 5 is a view schematically showing a cross section along the axial direction of the exhaust gas purification catalyst in accordance with a second embodiment.

Then, a second embodiment regarding an exhaust gas purification catalyst herein disclosed will be described. FIG. 5 is an enlarged view of a cross section along the axial direction of an exhaust gas purification catalyst in accordance with the second embodiment.

As shown in FIG. 5, for the exhaust gas purification catalyst 1 in accordance with the first embodiment, the catalyst layer 20 including a single layer is formed on the surface of the partition wall 14 of the base material 10. However, the catalyst layer is not limited to such a form, and may have a multi-layer structure of two or more layers. For example, as shown in FIG. 5, in the exhaust gas purification catalyst 1 in accordance with the second embodiment, the catalyst layer 20 having a two-layer structure including a lower layer 22 and an upper layer 24 is formed. In this case, rare earth-carrying alumina may be added to any one layer of the lower layer 22 and the upper layer 24, and may be added to both the layers. Incidentally, when rare earth-carrying alumina is added to any one of the lower layer 22 and the upper layer 24, the rare earth-carrying alumina is preferably added to the lower layer 22. Immediately after the operation of the internal combustion engine, the flow rate of the exhaust gas is low. Accordingly, an exhaust gas tends to be supplied to the lower layer side of the catalyst layer 20. For this reason, when the rare earth-carrying alumina capable of removing NOx and CO by adsorption is added to the lower layer 22, emission of NOx and Co under low-temperature environment immediately after the operation of the internal combustion engine can be preferably suppressed.

Further, when the catalyst layer 20 of a two-layer structure as in FIG. 5 is formed, the kind and the content of the noble metal catalyst can be varied between respective layers of the lower layer 22 and the upper layer 24. In this case, in consideration of the flow rate of an exhaust gas, the content of the noxious component, and the like, the kind and the content of the noble metal catalyst in each layer are preferably adjusted. Incidentally, according to the study by the present inventors, while the rare earth-carrying alumina (Ce-carrying alumina) having a rare earth particle including Ce as the main element exhibits an excellent adsorption performance with respect to NOx and CO, it may hinder the catalyst activity of rhodium (Rh). For this reason, when Ce-carrying alumina is used, the Ce-carrying alumina is preferably added to a catalyst layer not including Rh added therein. As one example, when the noble metal catalyst of the upper layer 22 is Rh, and the noble metal catalyst of the lower layer 24 is Pd, Ce-carrying alumina is preferably added to the lower layer 24. Further, any one of the lower layer 22 and the upper layer 24 forming the catalyst layer 20 may be a catalyst-less layer not including a noble metal catalyst therein. In this case, by adding rare earth-carrying alumina to the catalyst-less layer, it is possible to allow the catalyst-less layer to function as a NOx/CO adsorption layer.

Third Embodiment

As described above, according to the study by the present inventors, it has been confirmed that rare earth-carrying alumina (La-carrying alumina) having a rare earth particle including La as the main element has a function of enhancing the chemically purifying performance by a noble metal catalyst. In a third embodiment, a description will be given to an exhaust gas purification catalyst in which such La-carrying alumina is added to the catalyst layer.

As described above, in the exhaust gas purification catalyst herein disclosed, a rare earth particle including a rare earth element (such as Y, La, Ce, Pr, or Nd) is carried in a state of a microscopic primary particle on an alumina carrier. However, out of the rare earth particles, a rare earth particle including La as the main element has a function of improving the chemically purifying performance by the Pd when allowed to coexist with palladium (Pd) in the catalyst layer. Specifically, for a general exhaust gas purification catalyst, the electronic state of Pd present in the catalyst layer is zero valence to divalence. However, for a catalyst layer including microscopic La particle highly dispersed therein, the electronic state of Pd can increase to tetravalence. Such a tetravalent Pd has a strong reducing action with respect to NOx, and hence can more preferably purify NOx. For example, when the reduction of NOx in the exhaust gas is incomplete, ammonia ($NH_3$) of a noxious component may be exhausted. However, in accordance with the present embodiment, the incomplete reduction of NOx can be suppressed, which can largely reduce the $NH_3$ exhaust amount.

Incidentally, the $NH_3$ reducing effect by the coexistence of La-carrying alumina and Pd is preferably exhibited in the case where the oxide equivalent weight of other elements is 80 wt % or less when the oxide equivalent weight of La in the rare earth particle is assumed to be 100 wt %, (i.e., La is included as the main component of the rare earth particle). Incidentally, from the viewpoint of allowing the $NH_3$ reducing effect to be more preferably exhibited, the oxide equivalent weight of other elements is properly 60 wt % or less, preferably 40 wt % or less, more preferably 20 wt % or less, further preferably 15 wt % or less, and in particular preferably 10 wt % or less, and is for example, 0 wt % (a rare earth particle including only La).

Further, in the present embodiment, other noble metal catalysts than Pd (such as Rh and Pt) may be included in the catalyst layer. However, from the viewpoint of allowing the $NH_3$ reducing effect to be further preferably exhibited, the content of Pd is more preferably larger. For example, the content of other noble metal catalysts when the content of Pd in the catalyst layer is assumed to be 100 wt % is preferably 80% or less, more preferably 60 wt % or less, further preferably 40 wt % or less, and in particular preferably 20 wt % or less, and is for example, 0 wt % (only Pd being added as a noble metal catalyst).

Further, the $NH_3$ reducing effect can be changed according to the weight ratios of La and the alumina carrier in the La-carrying alumina, the content of Pd relative to the specific surface area of the alumina carrier, the Pd content relative to the pore volume of the catalyst layer, and the like. For example, the content of the rare earth particle (La) when the content of the alumina carrier is assumed to be 100 wt % is preferably 1 wt % to 50 wt %, more preferably 2 wt % to 40 wt %, further preferably 3 wt % to 30 wt %, and in particular preferably 4 wt % to 15 wt %. As a result of this, it is possible to further improve the $NH_3$ reducing effect.

Method for Manufacturing Exhaust Gas Purification Catalyst

Then, a description will be given to a method for manufacturing an exhaust gas purification catalyst in accordance with the present embodiment. The manufacturing method includes a step of manufacturing rare earth-carrying alumina, and a step of forming a catalyst layer on the surface of a base material.

(1) Manufacturing of Rare Earth-Carrying Alumina

In the present step, a rare earth particle is carried on the surface of an alumina carrier, thereby manufacturing rare earth-carrying alumina. In the present step, first, a solution including a rare earth element sufficiently dissolved therein (rare earth solution) is prepared. Then, the rare earth solution is deposited on the surface of the alumina carrier, followed by drying/burning. As a result of this, it is possible to manufacture rare earth-carrying alumina in which a primary particle of the rare earth particle is carried on the surface of the alumina carrier therein.

Incidentally, in order to allow a rare earth particle with a sufficiently small particle diameter to be carried in a highly dispersed state on the surface of the alumina carrier, in the present step, a spray dry method is preferably used. Specifically, an alumina carrier is floated in the inside of the channel through which an inert gas has been circulated, so that the rare earth solution is sprayed into the channel inside. As a result of this, very microscopic droplets of the rare earth solution are deposited on the surface of the alumina carrier. For this reason, by burning this, it is possible to allow a primary particle of a rare earth particle with an average particle diameter $D_{50}$ of 10 nm or less to be carried on the surface of the alumina carrier with ease. Incidentally, when such a spray dry method is adopted, the rare earth solution is preferably sprayed so that the droplet diameter becomes 800 μm or less (more preferably 600 μm or less, further preferably 500 μm or less, and in particular preferably 400 μm or less). As a result of this, it is possible to allow a rare earth particle with a microscopic particle diameter to be carried on the alumina carrier with stability.

(2) Formation of Catalyst Layer

Then, in the present step, a catalyst layer including rare earth-carrying alumina is formed on the base material surface. The means for forming the catalyst layer in the present step has no particular restriction, and a conventionally known method can be adopted without particular restriction. For example, first, a slurry including various materials including rare earth-carrying alumina (such as a noble metal catalyst and an OSC material) dispersed in disperse medium (such as water) therein is prepared. Then, the slurry is introduced into the cell of the base material, and then, is deposited on the partition wall surface of the base material using air blow, or the like. Then, drying/burning are performed under prescribed conditions. As a result of this, a catalyst layer including rare earth-carrying alumina is formed on the surface of the partition wall of the base material, thereby manufacturing an exhaust gas purification catalyst. Incidentally, from the viewpoint of surely preventing coarsening of the rare earth particle included in the rare earth-carrying alumina by sintering, the drying/burning of the slurry in the present step are preferably carried out under a temperature condition of 600° C. or less.

Up to this point, a description has been given to the method for manufacturing an exhaust gas purification catalyst in accordance with the present embodiment. However, the exhaust gas purification catalyst herein disclosed may only be configured such that rare earth-carrying alumina including a rare earth particle with an average particle diameter $D_{50}$ of 10 nm or less is added to the catalyst layer, and is not limited by the manufacturing method.

Test Example

Below, a test example regarding the present invention will be described. However, it is not intended that the present invention is limited to the following test examples.

First Experiment

In the present experiment, a study was conducted on the effect of the particle diameter and the dispersibility of the rare earth particle in the rare earth-carrying alumina exerted on the NOx adsorption performance and the CO adsorption performance 1. Preparation of Sample
(1) Sample 1

In the present sample, to a lower layer of an exhaust gas purification catalyst having a catalyst layer of a two-layered structure of an upper layer and the lower layer, rare earth-carrying alumina (Ce-carrying alumina) manufactured using a spray dry method was added.

Specifically, first, a compound including a rare earth element (Ce) (cerium nitrate hexahydrate) was dissolved in a solvent (water), thereby preparing a rare earth solution (Ce solution). Then, $La_2O_3$ composite alumina including lanthanum oxide ($La_2O_3$) in an amount of 5 wt % was prepared as an alumina carrier. Then, after depositing the Ce solution on the alumina carrier using a spray dry method, burning (500° C., two hours) was carried out, thereby manufacturing Ce-carrying alumina. Incidentally, in the present sample, the amount of the Ce solution to be supplied in the spray dry method was adjusted so that Ce is carried in an amount of 15 wt % for every 100 wt % of the alumina carrier.

Then, a slurry for the lower layer obtained by mixing palladium nitrate, Ce-carrying alumina, an OSC material ($CeO_2$-$ZrO_2$ composite oxide), barium sulfate ($BaSO_4$), a binder ($Al_2O_3$ type binder), and a solvent (water) was prepared. The slurry for the lower layer was introduced into the cell of the base material, and air blow was performed. Then, a drying treatment (120° C., 2 hours) and a burning treatment (500° C., 2 hours) were carried out, thereby forming a lower layer of the catalyst layer on the surface of the partition wall of the base material. Incidentally, the base material used in the present test is a straight flow base material made of cordierite having a honeycomb structure with a volume of 850 cc, a thickness of the partition wall of 2 mm, and a number of cells of 900. Further, in the present sample, in the lower layer after formation, the components of the slurry for the lower layer and the amount of the slurry to be supplied into the base material were adjusted so that 2.0 g/L of Pd, 50 g/L of Ce-carrying alumina, 20 g/L of OSC material, and 5.0 g/L of barium sulfate were included therein.

Then, a slurry for the upper layer obtained by mixing rhodium nitrate, an alumina carrier ($La_2O_3$ composite alumina), an OSC material (a $CeO_2$-$ZrO_2$ composite oxide), a binder (an $Al_2O_3$ type binder), and a solvent (water) was prepared. Then, the slurry for the upper layer was introduced into the cell of the base material, and air blow was performed. Then, a drying treatment (120° C., 2 hours) and a burning treatment (500° C., 2 hours) were carried out, thereby forming an upper layer on the surface of the lower layer. As a result of this, an exhaust gas purification catalyst having a catalyst layer of a two layer structure, and including Ce-carrying alumina added in the lower layer therein was manufactured. Incidentally, in the formation of the upper layer, the components of the slurry for the upper layer and the amount of the slurry to be supplied into the base material were adjusted so that 0.13 g/L of Rh, 55 g/L of an alumina carrier, 50 g/L of an OSC material are included in the upper layer after formation.

(2) Sample 2

For a sample 2, an exhaust gas purification catalyst was manufactured by the same procedure as that for the sample 1, except for manufacturing Ce-carrying alumina with a lower carrying amount of Ce than that of the sample 1. Incidentally, for the present sample, the amount of the Ce solution to be supplied in the spray dry method was adjusted so that 5 wt % of Ce was carried for every 100 wt % of the alumina carrier.

(3) Sample 3

For a sample 3, an exhaust gas purification catalyst was manufactured by the same procedure as that for the sample 1, except for using Ce-carrying alumina manufactured with the immersion method. For manufacturing Ce-carrying alumina in the present sample, first, an alumina carrier ($La_2O_3$ composite alumina) was immersed in the rare earth solution (Ce solution) prepared by the same procedure as that for the sample 1. Then, a drying treatment (250° C., 2 hours) and a burning treatment (500° C., 2 hours) were carried out on the solution, resulting in Ce-carrying alumina. Then, the resulting powder was disaggregated, so that the particle size was adjusted.

2. Evaluation Test
(1) Microscopic Observation

Figure 6:
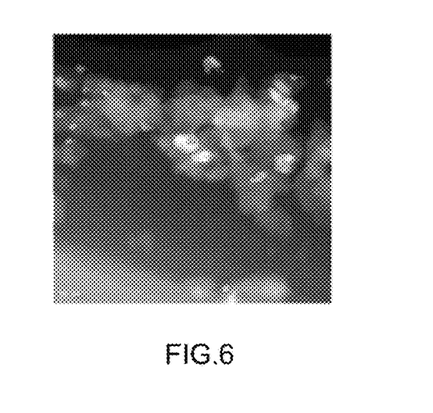
FIG. 6 is a TEM photograph (magnifying power: 1200000 times) of a sample 1 in a test example.
Figure 7:
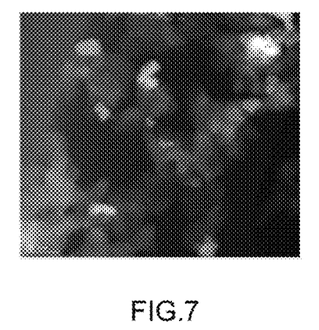
FIG. 7 is a TEM photograph (magnifying power: 1200000 times) of a sample 2 in a test example.
Figure 8:
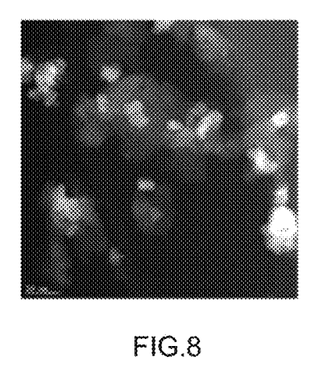
FIG. 8 is a TEM photograph (magnifying power: 1200000 times) of a sample 3 in a test example.

In the manufacturing step, some of the Ce-carrying alumina before being added to the catalyst layer (lower layer) was collected, and was added to a mixed solvent of ethanol and water. Then, after performing dispersion using an ultrasonic dispersion device, the dispersion liquid was added dropwise to a Cu mesh grid, and was dried, thereby manufacturing a measurement sample. Then, observation was conducted with a transmission electron microscope (manufactured by JEOL Ltd., model: JEM-F200), and a TEM photograph was taken. One example of the TEM photograph (magnifying power: 1200000 times) of the sample 1 is shown in FIG. 6, one example of the TEM photograph of the sample 2 is shown in FIG. 7, and one example of the TEM photograph of the sample 3 is shown in FIG. 8. In the TEM photographs, each portion appearing in a white color indicates a Ce particle.

Then, in the TEM observation, in each of four visual fields, the equivalent circle diameters of 10 Ce particles were measured, and the "average particle diameter $D_{50}$ of the Ce particles" was calculated on the measurement results. The measurement results are shown in Table 1. Further, the maximum particle diameter $D_{Max}$ observed in such measurement of the equivalent circle diameters of the Ce particles is also shown in Table 1. Further, in the present test, the numbers of the primary particles and the secondary particles of the Ce particles were counted in four visual fields, and the proportion of the number of the primary particles based on the total number of particles (the number of the primary particles+ the number of the secondary particles) was calculated, thereby determining the "proportion of the primary particles of Ce particles". Such measurement results are also shown in Table 1.

Figure 9:
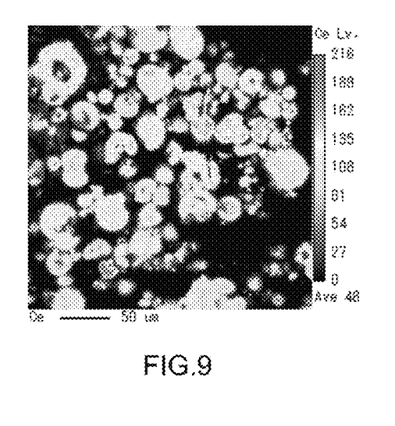
FIG. 9 is the results of EPMA analysis (magnifying power: 300 times) of the sample 1 in a test example.
Figure 10:
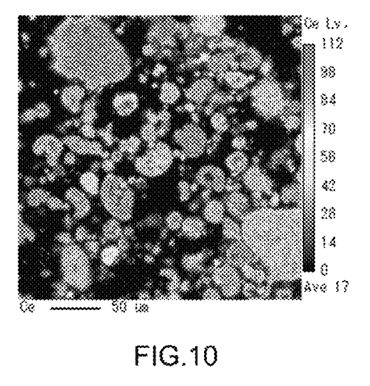
FIG. 10 is the results of EPMA analysis (magnifying power: 300 times) of the sample 2 in a test example.
Figure 11:
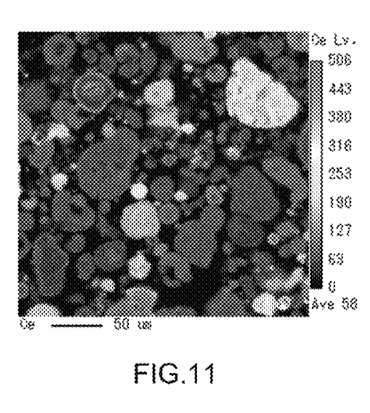
FIG. 11 is the results of EPMA analysis (magnifying power: 300 times) of the sample 3 in a test example.

Further, in the present test, EPMA analysis was carried out on the measurement sample including Ce-carrying alumina, thereby examining the distribution of the Ce particles carried on the surface of the alumina carrier. The results of the EPMA analysis of the sample 1 (magnifying power: 300 times) are shown in FIG. 9, the results of the EPMA analysis of the sample 2 are shown in FIG. 10, and the results of the EPMA analysis of the sample 3 are shown in FIG. 11. Incidentally, in the photographs, the portions appearing in a while color indicate Ce particles.

(2) Adsorption Performance Evaluation

The exhaust gas purification catalyst of each sample was attached on an engine bench, and an exhaust gas including NOx and CO was supplied thereto, thereby evaluating the NOx adsorption performance and the CO adsorption performance. Specifically, a hydrogen-containing $N_2$ gas at a heating rate of 35° C./min (flow rate: 8 L/min) was supplied for 6 minutes, and the exhaust gas purification catalyst was heated up to 200° C. Then, while keeping the temperature, a reduction treatment of supplying the hydrogen-containing $N_2$ gas for two minutes was performed. Then, a gas replacement treatment of supplying a $N_2$ gas for 1 minute was performed. Then, 2000 ppm nitrogen monoxide (NO) and 3000 ppm carbon monoxide (CO) were mixed in the $N_2$ gas, which was supplied for 4 minutes. Then, the NO concentration on the upstream side of the sample, and the NO concentration on the downstream side were measured. Thus, the NO adsorption rate was calculated based on the following equation (1), thereby evaluating the NOx adsorption performance. Similarly, the CO concentration on the upstream side of the sample, and the CO concentration on the downstream side were measured. Thus, the CO adsorption rate was calculated based on the following equation (2), thereby evaluating the CO adsorption performance. Respective measurement results are shown in Table 1.

NO adsorption rate=(NO concentration on the upstream side−NO concentration on the downstream side)/NO concentration on the upstream side×100     (1)

CO adsorption rate=(CO concentration on the upstream side−CO concentration on downstream side)/CO concentration on the upstream side×100     (2)

the other hand, for the sample 3, a large number of secondary particles including primary particles of Ce aggregated were observed. Both of the average particle diameter $D_{50}$ and the maximum particle diameter $D_{Max}$ were larger than those of the samples 1 and 2. Then, confirmation of the adsorption performance with respect to NOx and Co indicated that the samples 1 and 2 exhibited higher performances than those of the sample 3. This has indicated that the Ce-carrying alumina in which microscopic Ce particles having an average particle diameter of 10 nm or less are carried in a highly dispersed state on the surface of the alumina carrier as with the samples 1 and 2 exhibits a high purifying performance with respect to NOx and CO by being added to the catalyst layer of the exhaust gas purification catalyst.

Second Experiment

In the present experiment, a study was conducted on the effects exerted by other elements (other elements than Ce) included in the rare earth particle (Ce particle) exerted on the NOx adsorption performance and the CO adsorption performance.

1. Preparation of Sample
(1) Sample 4

For a sample 4, an exhaust gas purification catalyst was manufactured by the same procedure as those for the sample 1, except that Ce-carrying alumina with a larger carrying amount of Ce than that of the sample 1 of the first test was manufactured. Incidentally, in the present sample, the amount of the Ce solution to be supplied in the spray dry method was adjusted so that 20 wt % of Ce was carried for every 100 wt % of the alumina carrier.

(2) Sample 5

For a sample 5, an exhaust gas purification catalyst was manufactured by the same procedure as that for the sample 4, except that Pr was added to a rare earth solution (Ce solution) to be sprayed with the spray dry method. Incidentally, in the present sample, the concentrations of Ce and Pr in the rare earth solution were adjusted, and the amount of the rare earth solution to be supplied in the spray dry method was adjusted so that 4 wt % of Ce was carried and 16 wt % of Pr was carried for every 100 wt % of the alumina carrier. Incidentally, for the sample 5, the total carrying amount of the rare earth particles was 20 wt %, and the ratio of other elements than Ce (Pr) based on the total carrying amount was 80%.

TABLE 1

| | Manufacturing method | Ce carrying amount (wt %) | Average particle diameter $D_{50}$ of Ce particles (nm) | Maximum particle diameter $D_{Max}$ of Ce particles (nm) | Proportion of primary particles of Ce particles (%) | NO adsorption rate (%) | CO adsorption rate (%) |
|---|---|---|---|---|---|---|---|
| Sample 1 | Spray dry method | 15 | 8.50 | 14.09 | 71 | 20 | 40 |
| Sample 2 | | 5 | 8.66 | 18.01 | 65 | 19 | 36 |
| Sample 3 | Immersion method | 15 | 11.7 | 26.04 | 32 | 15 | 30 |

3. Evaluation Results

As shown in FIGS. 6 to 11, and Table 1, the Ce-carrying alumina (sample 1 or 2) manufactured using the spray dry method was carried on the surface of the alumina carrier with microscopic Ce particles having an average particle diameter $D_{50}$ of 10 nm or less highly dispersed therein. On (3) Sample 6

For a sample 6, an exhaust gas purification catalyst was manufactured by the same procedure as that for the sample 5, except that the carrying amount of the rare earth was made smaller than that of the sample 5. Incidentally, in the present sample, the amount of the rare earth solution to be supplied in the spray dray method was adjusted so that 10 wt % of rare earth particle was carried for every 100 wt % of the alumina carrier.

(4) Sample 7

For a sample 7, an exhaust gas purification catalyst was manufactured by the same procedure as that for the sample 5, except that the amount of Pr to be added to the rare earth solution was made smaller. Incidentally, for the present sample, the concentrations of Ce and Pr in the rare earth solution were adjusted so that the amount of Pr became 10 wt % based on the total carrying amount of the rare earth particles.

(5) Sample 8

For a sample 8, an exhaust gas purification catalyst was manufactured by the same procedure as that for the sample 4, except that Ce and Nd were added to the rare earth solution to be sprayed with the spray dry method. Incidentally, for the present sample, the concentrations of Ce and Nd in the rare earth solution were adjusted so that the amount of Nd became 20 wt % based on the total carrying amount of the rare earth particles.

(6) Sample 9

For a sample 9, an exhaust gas purification catalyst was manufactured by the same procedure as that for the sample 8, except that the elements to be added to the rare earth solution were changed to Ce and Y.

(7) Sample 10

For a sample 10, an exhaust gas purification catalyst was manufactured by the same procedure as that for the sample 8, except that the elements to be added to the rare earth solution were changed to Ce and Zr.

(7) Sample 11

For a sample 11, an exhaust gas purification catalyst was manufactured by the same procedure as that for the sample 4, except that an alumina carrier ($La_2O_3$ composite alumina) was added in place of the Ce-carrying alumina for forming the lower layer of the catalyst layer.

(8) Samples 12 to 14

For samples 12 to 14, each exhaust gas purification catalyst was manufactured by the same procedure as that for the sample 4, except that La-carrying alumina of rare earth-carrying alumina having a rare earth particle including La as the main element was used in place of the Ce-carrying alumina. Incidentally, as shown in Table 2, for the samples 12 to 14, the amount of the La solution to be supplied in the spray dry method was adjusted, so that the carrying amount of La for every 100 wt % of the alumina carrier was varied.

2. Evaluation Test

By the same procedure as that of the first test, the NO adsorption rate and the CO adsorption rate of each sample were determined. The results are shown in Table 2. Further, in Table 2, the NO adsorption rate and the CO adsorption rate of the samples 1 to 3 measured at the first test are also described together.

TABLE 2

| | | | Other elements than Ce | | | | |
|---|---|---|---|---|---|---|---|
| | Rare earth carrying amount (wt %) | Ce carrying amount | Kind | Content (wt %) | Ratio relative to rare earth carrying amount (%) | NO adsorption rate (%) | CO adsorption rate (%) |
| Sample 1 | 15 | 15 | — | — | — | 20 | 40 |
| Sample 2 | 5 | 5 | — | — | — | 19 | 36 |
| Sample 3 | 15 | 15 | — | — | — | 15 | 30 |
| Sample 4 | 20 | 20 | — | — | — | 19 | 36 |
| Sample 5 | 20 | 4 | Pr | 16 | 80 | 18 | 35 |
| Sample 6 | 10 | 2 | Pr | 8 | 80 | 19 | 36 |
| Sample 7 | 20 | 18 | Pr | 2 | 10 | 20 | 40 |
| Sample 8 | 20 | 16 | Nd | 4 | 20 | 19 | 36 |
| Sample 9 | 20 | 16 | Y | 4 | 20 | 17 | 33 |
| Sample 10 | 20 | 16 | Zr | 4 | 20 | 19 | 36 |
| Sample 11 | — | — | — | — | — | 10 | 16 |
| Sample 12 | 4 | — | La | 4 | — | 27 | 19 |
| Sample 13 | 10 | — | La | 10 | — | 29 | 22 |
| Sample 14 | 15 | — | La | 15 | — | 30 | 30 |

3. Evaluation Results

Although not shown, TEM observation was performed on each sample. As a result, it has been confirmed that for the samples 4 to 10, as with the samples 1 and 2, microscopic Ce particles with an the average particle diameter $D_{50}$ or 10 nm or less are carried in a highly dispersed state on the surface of the alumina carrier.

Then, as shown in Table 2, the results of the samples 1, 2, and 4 have indicated that a preferable adsorption performance with respect to NOx and CO can be exhibited when the carrying amount of the Ce particles based on the amount of the alumina carrier falls within the range of 5 to 20 wt %. Then, the results of the samples 5 to 9 have indicated that when the main element of the rare earth particle is assumed to be Ce, a preferable adsorption performance with respect to NOx and CO can be exhibited even if other rare earth elements are added. It has also been confirmed that the amount of other elements to be added at this step is preferably 80 wt % or less based on the total carrying amount of the rare earth particles. Further, the results of the sample 10 have indicated that a preferable adsorption performance with respect to NOx and CO can be exhibited even when Zr of a metal element other than the rare earth element is added. Still further, as shown with the samples 12 to 14, it has been indicated that when the main element of the rare earth particle is assumed to be La, an exhaust gas purification catalyst with a particularly high adsorption performance with respect to NOx can be constructed, and that when the carrying amount is set at 15 wt %, the CO adsorption performance comparable to that of Ce is exhibited.

Up to this point, the specific examples of the present invention have been described in details. However, these are merely examples, and do not limit the appended claims. The technology described in the appended claims includes various modifications and changes of the specific examples exemplified up to this point.

INDUSTRIAL APPLICABILITY

In accordance with the present invention, it is possible to provide an exhaust gas purification catalyst exhibiting a high exhaust gas purifying performance. Such an exhaust gas purification catalyst is high in purifying performance with respect to NOx and CO in low-temperature environment, and is excellent in catalyst warm-up performance. For this reason, the exhaust gas purification catalyst can preferably purify an exhaust gas exhausted in low-temperature environment in which the chemical purification by a noble metal catalyst does not function sufficiently.

The invention claimed is:

1. An exhaust gas purification catalyst arranged in an exhaust passage of an internal combustion engine for purifying an exhaust gas exhausted from the internal combustion engine, the exhaust gas purification catalyst comprising:
a base material and
a catalyst layer formed on a surface of the base material,
wherein the catalyst layer includes rare-earth-carrying alumina having a primary particle of a rare-earth particle including at least one rare-earth element carried on a surface of an alumina carrier, and
an average particle diameter D50 based on TEM observation of the rare-earth particle in the rare-earth-carrying alumina is 10 nm or less.

2. The exhaust gas purification catalyst according to claim 1, wherein the catalyst layer further includes a noble metal catalyst.

3. The exhaust gas purification catalyst according to claim 1, wherein an oxide equivalent weight of the rare-earth particle is 5 wt % or more and 20 wt % or less when an oxide equivalent weight of the alumina carrier is assumed to be 100 wt %.

4. The exhaust gas purification catalyst according to claim 1, wherein a specific surface area of the alumina carrier after carrying out a 1000° C. durability test for 10 hours is 50 m²/g or more.

5. The exhaust gas purification catalyst according to claim 1, wherein the rare-earth particle includes at least one or more rare-earth elements selected from the group consisting of Y, La, Ce, Pr, and Nd.

6. The exhaust gas purification catalyst according to claim 5, wherein the rare-earth particle includes Ce as a main element.

7. The exhaust gas purification catalyst according to claim 6, wherein the rare-earth particle has an oxide equivalent weight of the elements other than Ce of 80 wt % or less based on a 100 wt % of the rare-earth element.

8. The exhaust gas purification catalyst according to claim 5, wherein the catalyst layer includes La as the main element of the rare-earth particle and includes Pd as a noble metal catalyst.

* * * * *